United States Patent [19]  
Jones

[11] 4,365,649  
[45] Dec. 28, 1982

[54] SEWER PIPE PLUG

[76] Inventor: Thomas E. Jones, P.O. Box 665, Aldergrove, British Columbia, Canada, V0X 1A0

[21] Appl. No.: 252,740

[22] Filed: Apr. 10, 1981

[51] Int. Cl.³ .................. F16L 55/10; F16L 55/12
[52] U.S. Cl. .................................. 138/93; 138/89; 73/40.5 R
[58] Field of Search ................ 138/89, 93, 90; 73/40.5 R

[56] References Cited  
U.S. PATENT DOCUMENTS

| | | |
|---|---|---|
| 1,221,733 | 4/1917 | Henderson . |
| 2,130,030 | 9/1938 | Richardson .................. 138/93 |
| 3,190,679 | 6/1965 | Lester .......................... 138/93 X |
| 3,451,259 | 6/1969 | McNulty . |
| 3,453,869 | 7/1969 | Cherne . |
| 3,726,319 | 4/1973 | Patterson .................... 138/93 X |
| 3,884,261 | 5/1975 | Clynch ........................ 138/93 X |
| 3,902,528 | 9/1975 | Tortabini et al. ............ 138/93 X |

Primary Examiner—James E. Bryant, III  
Attorney, Agent, or Firm—Townsend and Townsend

[57] ABSTRACT

A plug for a sewer pipe has an inner sleeve with threaded opposite ends. A pair of longitudinally aligned outer sleeves having cylindrical outer surfaces and opposite end edges are slidably mounted on the inner sleeve. An inflatable tube is carried by the outer sleeves, the tube having inner and outer walls as well as end folds. Air valves are fitted to the end folds to admit pressurized air into an air chamber provided within the tube. The threaded opposite ends of the inner sleeve are each fitted with a collar which is engaged by an end closure provided with an inlet port and an outlet port. Removable stoppers normally close each inlet and outlet port. The plug can be inflated within an end of a sewer line to provide a positive leakproof seal against a head of water. Also two of the plugs can be connected together in an assembly which allows a sewer line to be pressure tested.

7 Claims, 6 Drawing Figures

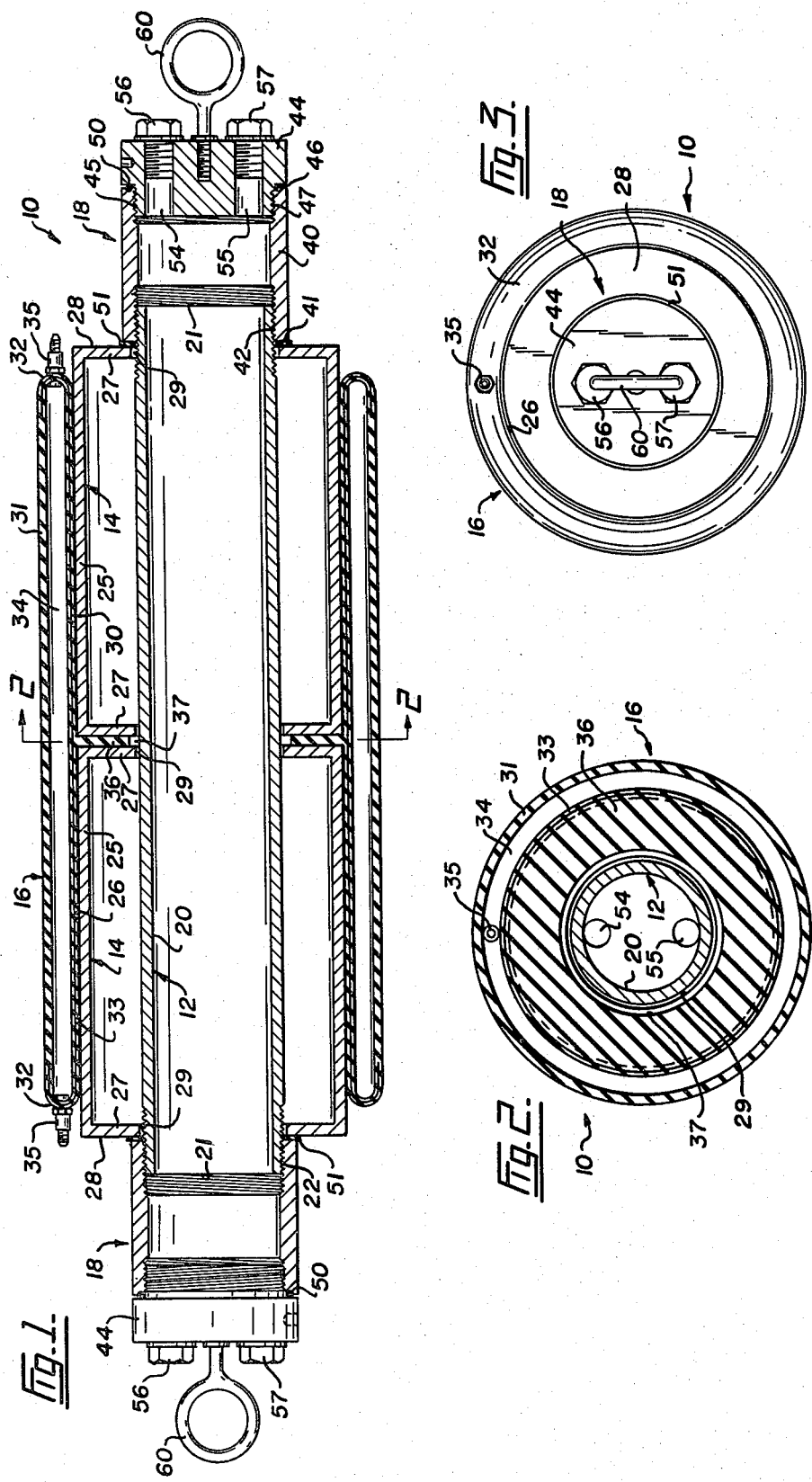

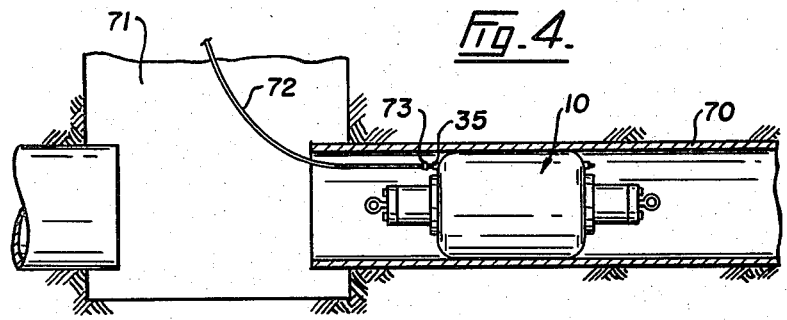
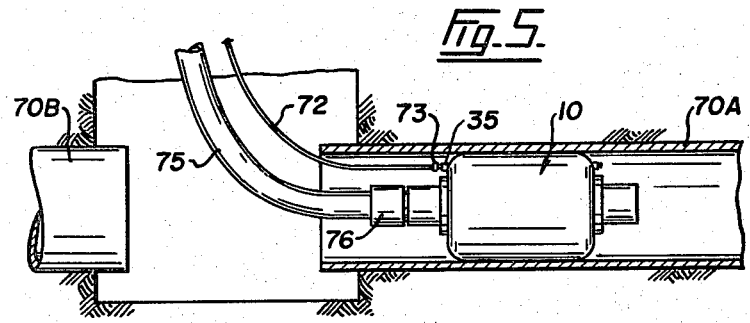
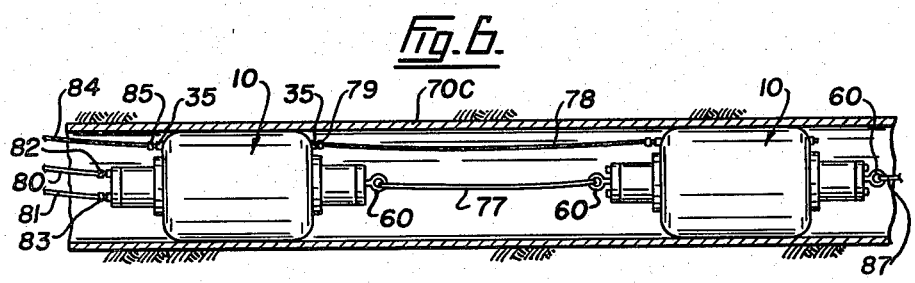

SEWER PIPE PLUG

BACKGROUND OF THE INVENTION

This invention relates to devices for temporarily plugging installed sewer lines as must be done on occasions when repair work or pressure testing is required.

There are devices presently available which are used for the same purpose as this invention, namely, to stop the normal flow of water in a pipe line. Such plugs or stoppers are required in a line, for example, when repairs or maintenance work must be done or when leaks occur which must first of all be located and then be measured to determine if it is necessary to excavate and replace a section of the buried line. The known devices of this type are quite complex and bulky which makes them difficult to assemble and then install in the end of a pipe which is accessible in most cases only through a manhole of limited size. Since sewer line plugs are expected to provide a fluidtight seal even when the pressure exerted by the head of water in the pipe is fairly high, it is important that the plug be capable of effecting a proper seal even when the interior of the line is dirty or has otherwise deteriorated and this has not always been the case when conventional plugs or stoppers are used.

SUMMARY OF THE INVENTION

The present invention is a simply constructed and relatively inexpensive device which can readily be assembled and tightened into an operating condition suitable for use in several pipe plugging and testing applications. Only a few parts make up the plug and some of these parts are purposely duplicated so that the device can be assembled to meet a fairly wide range of requirements. It is also a simple matter to repair or replace worn parts should it become necessary to do so and this can be done without keeping a large supply of parts on hand. The plug has an inflatable tube which is clamped at the center and is thus held against movement longitudinally of the remainder of the device while being allowed to expand radially from the clamped central location. A tube constructed and held in this manner can be expanded into proper sealing engagement with pipes of various sizes, for example, one of the smaller diameter plugs contemplated by the present invention will effectively seal a 6, 8 or 10 inch pipe. The construction of the plug provides a contractor with a number of options as to where the device may be used either alone or in combination with another identical plug according to whether a line is to be simply plugged or must be tested for leaks.

BRIEF DESCRIPTION OF THE DRAWINGS

FIG. 1 is a longitudinal section of the present sewer pipe plug,

FIG. 2 is a vertical section taken on the line 22 of FIG. 1,

FIG. 3 is an end elevation of the plug,

FIG. 4 is a schematic view showing the plug installed in a sewer pipe to serve as a simple stopper, FIG. 5 is another schematic view showing the plug installed in a sewer pipe to serve as a bypass, and FIG. 6 is still another schematic view showing two of the present plugs connected together in an assembly which allows pressure testing of a sewer pipe to be done.

DESCRIPTION OF THE PREFERRED EMBODIMENTS

Referring to the drawings, the numeral 10 indicates generally a sewer pipe plug constructed in accordance with the present invention. The plug 10 is shown best in FIG. 1 as comprising an inner sleeve 12 on which a pair of outer sleeves 14 are mounted. An inflatable tube 16 is carried by the pair of outer sleeves. Clamping means 18 secured to opposite ends of the inner sleeve lock these major parts of the plug together as a unit.

The inner sleeve 12 consists of a length of aluminum tubing which has an unobstructed or smooth through bore 20. Each opposite end 21 of the inner sleeve has a thread 22 which extends only a short distance along the outer surface of the sleeve.

The identical outer sleeves 14 preferably are aluminum castings and each sleeve has a peripheral wall 25 which provides a cylindrical outer surface 26 and flanges 27 which provide opposite end edges 28. The annular flanges 27 extend radially inwards and their inner edges form circular openings 29 which accommodate the sleeve 12. The inner sleeve forms a reasonably snug fit within the openings 28 but can slide freely through the longitudinally-aligned outer sleeves when one of the clamping means 18 is removed. The relative lengths of the several sleeves of the plug are such that the threaded ends 21 of the inner sleeve project a short distance beyond the opposite end edges 28 of the outer sleeves when the tube 16 is clamped therebetween.

The inflatable tube generally indicated at 16 is constructed of fibre-reinforced rubber for strength and durability. In the deflated state shown in FIG. 1, the tube will be seen to have substantially parallel inner and outer walls 30 and 31 which are interconnected by end folds 32. A strong and suitably stiff fabric layer 33 is embedded in the wall 30 and the marginal edges of this strip extend around the folds 32 before terminating in the outer wall 31. A chamber 34 is provided within the tube and this chamber is adapted to be charged with air through conventional air valves 35 which are vulcanized one to each end fold 32. The valves 35 are longitudinally aligned and are located near the end flanges 27 at opposite ends of the pair of outer sleeves. Integrally formed with the inner wall 30 of the inflatable tube, is an annular web 36. This web extends radially inwards from the tube wall 30 at the exact center of the inflatable tube so as to be lodged between adjacent opposite end edges 28. The annular web has an inner edge 37 which is spaced from the outer periphery of the sleeve 12 a distance which will provide clearance between the edge and the sleeve if the web is extruded slightly as the result of being clamped and compressed between the pair of outer sleeves.

The clamping means located at each end of the inner sleeve and which is is generally indicated at 18 is shown to comprise a collar 40, the opposite ends 41 of which are provided with internal threads 42. The collar is fitted with a cylindrical end closure 44 having a reduced portion 45 and a shoulder 46. Portion 45 is threaded as at 47 to enter the collar in mesh with the threads 42.

An O-ring 50 is mounted on each end closure 44 so as to occupy the space between the end 41 of the collar and the shoulder 46 of the closure. Another O-ring 51 is provided at the opposite end 41 of each collar and the adjacent end edge 28 of one of the outer sleeves. The opposite ends 41 of the collars are suitably bevelled to engage the O-rings and provide a fluidtight seal in these locations when the clamping means 18 are tightened.

The inner sleeve 12 is intended to form part of a fluid bypassing or testing circuit and therefore the end closures 44 are each provided with ports 54 and 55. These transversely spaced ports are suitably threaded to receive bolt stoppers 56 and 57. Between the stoppers, each end closure is fitted with an outwardly-projecting eyebolt 60 which is located on the longitudinal axis of the inner sleeve.

Referring now to FIG. 4, the sewer pipe plug 10 is shown used simply as a stopper in a sewer line 70 made up of lengths of pipe having ends which enter the bottom of a manhole 71. The outside diameter of the deflated plug is such that the device can easily be fed through the relatively narrow opening leading into the manhole and can be lowered to the bottom by means of a rope attached to one of the eyebolts 60. The plug is pushed into the pipe end and an air hose 72 is attached to the accessible valve 35 by means of the standard fitting 73 provided on this type of hose. As air is pumped into the chamber 34 of the flexible tube 16, the outer wall 31 expands radially outwards starting in the vicinity of the web 36 so that the outer wall at this time curves downwardly towards the end folds 32. Continued expansion of the tube centers the plug in the line and gradually spreads the outer wall from its point of first contact with the surface of the pipe towards the extremities of the plug. This expanding and spreading action is attributed largely to the presence of the fabric layer 33 since the marginal edges of that reinforcing material stiffen the folds 32 and allow the more flexible outer wall 31 to make proper contact with the pipe. As a result, the wall 31 adjusts itself to any irregularities in the pipe surface and pushes at least some of the mud or the like which may be adhereing to the surface out of the way so that a good sealing contact can be made. Water which may infiltrate or be allowed into the line upstream of the plug will build up a head pressure behind the plug but very little if any of this water can escape passed the fully expanded tube due to its sealing action.

The plug 10 is sometimes used as a bypass for a section of the line and this arrangement is shown in FIG. 5. In this arrangement, both end closures 44 are removed from their collars 40 to open both ends of the bore 20. The plug 10 is entered into the pipe 70A preferably with a hose 75 attached thereto. This hose has a standard coupling 76 which is attachable to the internally threaded outer end of the collar which is accessible from the manhole. Hose 75 extends up the manhole, along the roadway and down the next manhole where it is similarly connected to another plug 10 installed in a section of the line next downstream from the pipe section designated 70B. The flow of water through the line is bypassed in this manner to leave the section 70B dry so that maintenance or other work can be done.

FIG. 6 shows two of the plugs 10 connected together for a low pressure air test of a section 70C of the sewer line. The main connection is by means of a rope or cable 77 which is attached to the eyebolts 60 of the spaced-apart plugs. A short length of air hose 78 also connects the two plugs, this hose having conventional end fittings 79 which are threaded to the opposing valves 35. The plug on the right is otherwise completely assembled but the plug on the left has the stoppers 56 and 57 removed from both end closures. The ports 54 and 55 on the extreme left have hoses 80 and 81 connected thereto by means of their fittings 82 and 83. Hose 80 leads to a source of pressurized air while the hose 81 extends to an air pressure gauge. Another air hose 84 having a fitting 85 is connected to the left valve 35 so that air can be pumped into both tubes almost simultaneously.

The deflated plugs assembled in this manner are drawn through the pipe usually by means of a cable 87 attached to the eyebolt on the extreme right. At appropriate intervals the interconnected plugs are halted and are inflated into sealing contact with the interior of the pipe. Low pressure air is pumped through the hose 80, bore 20 and the open ports 54 and 55 into the sealed space between the plugs. This pressure registers of the gauge connected to the hose 81 and any fall in the pressure is noted and timed. If the air loss exceeds a predetermined limit, the operators are made aware of a leak in that particular location along the length of the pipe. The plugs are deflated and the assembly is moved along the pipe approximately a distance equal to the length of the assembly where the testing operation is repeated.

From the foregoing description of the contruction and operation of the present plug, it will be apparent there is provided a device which has its inflatable tube firmly held by the metal parts so that expansion can take place as required effectively to seal off sewer lines of varying diameters and the bores of which may be uneven or in the need of cleaning. The metal parts themselves are few in number and nearly all are duplicated so that it is not necessary to keep a large inventory on hand and maintenance in the field is simplified. Furthermore, the construction generally provides a multi-purpose plug which can readily be assembled to suit a variety of needs without requiring the use of special tools.

I claim:

1. A sewer pipe plug comprising an inner sleeve having a bore and opposite ends, a pair of outer sleeves longitudinally aligned on the inner sleeve, said pair of outer sleeves each having a cylindrical outer surface and opposite end edges, an inflatable tube mounted on the pair of outer sleeves, said inflatable tube having inner and outer walls interconnected by end folds to define a chamber, said inner wall being in contact with the cylindrical outer surfaces and having an annular web extending radially inwards between opposite end edges of the pair of outer sleeves, a valve on the inflatable tube for charging the chamber with pressurized fluid, and clamping means secured to the inner sleeve for applying pressure to at least one of the pair of outer sleeves whereby to clamp the annular web between said outer sleeves and hold the inflatable tube against longitudinal movement.

2. A sewer pipe plug as claimed in claim 1, in which said clamping means includes opposite end members each having inlet and outlet ports both in communication with the bore of the inner sleeve, and a removable stopper fitted to each inlet and outlet port.

3. A sewer pipe plug as claimed in claim 2, in which said inner wall and end folds of the inflatable tube have reinforcing means making them less flexible than the outer wall whereby said outer wall is expanded radially outwards from the annular web when the chamber is charged with pressurized fluid.

4. A sewer pipe plug comprising an inner sleeve having a bore and opposite ends, a pair of outer sleeves slidably mounted on the inner sleeve for independent movement longitudinally thereof, said pair of outer sleeves each having a cylindrical outer surface and opposite end edges, an inflatable tube mounted on the cylindrical outer surfaces, said inflatable tube having inner and outer walls interconnected by end folds to define an air chamber, said inner wall having an annular web extending radially inwards between the pair of outer sleeves, an air valve on each end fold of the inflatable tube for charging the air chamber with pressurized air, said opposite ends of the inner sleeve being threaded, a threaded collar engaging each of the threaded opposite ends, and a closure member secured to each threaded collar, said closure members each having an inlet port and an outlet port both communicating with the bore of the inner sleeve, and a removable stopper lodged in each inlet and outlet port.

5. A sewer pipe plug as claimed in claim 4, and including a first sealing member providing a seal between each threaded collar and adjacent opposite end edge, and a second sealing member providing a seal between each closure member and the adjacent threaded collar.

6. A sewer pipe plug as claimed in claim 5, in which said inner wall and end folds of the inflatable tube include a reinforcing layer making them less flexible than the outer wall.

7. A sewer pipe plug as claimed in claim 6, and including an eyebolt projecting longitudinally of each closure member.

* * * * *